United States Patent
Recker et al.

(10) Patent No.: US 12,479,810 B2
(45) Date of Patent: Nov. 25, 2025

(54) PHENOTHIAZINE COMPOUND, ITS PREPARATION AND USE IN RUBBER BLENDS AND VEHICLE TIRES, AS AGEING PROTECTANT, ANTIOXIDANT, ANTIOZONANT AND COLORANT

(71) Applicant: Continental Reifen Deutschland GmbH, Hannover (DE)

(72) Inventors: Carla Recker, Hannover (DE);
Andreas Jacob, Hannover (DE);
David-Raphael Dauer, Dassel (DE);
Julian Strohmeier, Einbeck (DE);
Anna-Lena Dreier, Hannover (DE);
Jörg-August Becker, Hannover (DE);
Florian Matz, Hannover (DE);
Rebecca Graf, Hannover (DE); Jan Flormann, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 260 days.

(21) Appl. No.: 18/247,662

(22) PCT Filed: Sep. 29, 2021

(86) PCT No.: PCT/DE2021/200131
§ 371 (c)(1),
(2) Date: Apr. 3, 2023

(87) PCT Pub. No.: WO2022/069001
PCT Pub. Date: Apr. 7, 2022

(65) Prior Publication Data
US 2024/0018112 A1    Jan. 18, 2024

(30) Foreign Application Priority Data
Oct. 2, 2020   (DE) ................. 10 2020 212 508.2

(51) Int. Cl.
*C07D 279/20* (2006.01)
*B60C 1/00* (2006.01)
(Continued)

(52) U.S. Cl.
CPC .......... *C07D 279/20* (2013.01); *B60C 1/0016* (2013.01); *B60C 1/0025* (2013.01);
(Continued)

(58) Field of Classification Search
CPC ... C07D 279/20; B60C 1/0016; B60C 1/0025; B60C 1/00; C08K 5/46; C09B 21/00;
(Continued)

(56) References Cited

U.S. PATENT DOCUMENTS 3,047,572 A * 7/1962 Craig .................. C07D 279/18
564/430
3,389,124 A * 6/1968 Sparks .................. C09K 15/30
524/925
(Continued)

FOREIGN PATENT DOCUMENTS

CN    105130859 A    12/2015
CN    105272892 A    1/2016
(Continued)

OTHER PUBLICATIONS

Notice of Reasons for Refusal drafted Mar. 15, 2024 for the counterpart Japanese Patent Application No. 2023-519834 and machine translation of same.
(Continued)

*Primary Examiner* — Ellen M Mcavoy
(74) *Attorney, Agent, or Firm* — Richard A. Wolf; Gregory Adams

(57) ABSTRACT

The invention relates to a compound, to a rubber mixture containing the compound, to a vehicle tire comprising the
(Continued)

rubber mixture in at least one component, to a process for producing the compound and to the use of the compound as an aging stabilizer and/or antioxidant and/or antiozonant and/or dye.

The compound according to the invention has the formula I).

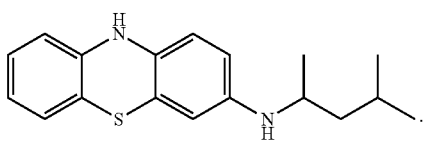

I)

8 Claims, 1 Drawing Sheet

(51) Int. Cl.
    C08K 5/46       (2006.01)
    C09B 21/00      (2006.01)
    C09D 7/41       (2018.01)
    C09K 15/30      (2006.01)
    C10L 1/24       (2006.01)
    C10M 135/36     (2006.01)
    C10N 30/10      (2006.01)
    C10N 40/25      (2006.01)

(52) U.S. Cl.
     CPC ............. *C08K 5/46* (2013.01); *C09B 21/00* (2013.01); *C09D 7/41* (2018.01); *C09K 15/30* (2013.01); *C10L 1/2456* (2013.01); *C10M 135/36* (2013.01); *C10M 2219/108* (2013.01); *C10N 2030/10* (2013.01); *C10N 2040/25* (2013.01)

(58) Field of Classification Search
     CPC ......... C09D 7/41; C09K 15/30; C10L 1/2456; C10M 135/36; C10M 2219/108; C10N 2030/10; C10N 2040/25
     USPC ........................................................ 508/251
     See application file for complete search history.

(56) References Cited

U.S. PATENT DOCUMENTS

| 3,413,291 | A |   | 11/1968 | Sparks |   |
|---|---|---|---|---|---|
| 4,897,436 | A | * | 1/1990 | Buysch ................ | C07D 279/20 544/38 |
| 4,915,858 | A | * | 4/1990 | Salomon ............... | C07C 323/25 568/57 |
| 5,273,669 | A | * | 12/1993 | Schumacher ........ | C10M 141/10 508/251 |
| 6,916,767 | B2 | * | 7/2005 | Duyck ................. | C10M 137/10 564/194 |
| 2005/0090407 | A1 | * | 4/2005 | Esche .................. | C10M 163/00 508/363 |
| 2010/0108239 | A1 |   | 5/2010 | Recker et al. |   |
| 2012/0157714 | A1 |   | 6/2012 | Kim |   |
| 2013/0315825 | A1 |   | 11/2013 | Tu |   |

FOREIGN PATENT DOCUMENTS

| CN | 106590827 A | 4/2017 |
| CN | 106590850 A | 4/2017 |
| CN | 107935867 A | 4/2018 |
| CN | 108069874 A | 5/2018 |
| JP | H10168038 A | 6/1998 |
| WO | 9909036 A1 | 2/1999 |
| WO | 2007110627 A2 | 10/2007 |
| WO | 2008083242 A1 | 7/2008 |
| WO | 2008083243 A1 | 7/2008 |
| WO | 2008083244 A1 | 7/2008 |
| WO | 2008083241 A3 | 8/2008 |
| WO | 2010049216 A2 | 5/2010 |
| WO | 2013132290 A2 | 9/2013 |
| WO | 2017011531 A2 | 1/2017 |

OTHER PUBLICATIONS

The International Search Report and the Written Opinion of the International Searching Authority mailed on Feb. 8, 2022, for the counterpart PCT Application No. PCT/.
Franko Andreani et al., "Ladder Oligophenothiazines by Direct Thionation of N-Arylanilino Derivaties", Dipartimento di Chimica Industriale e dei Materiali, Universitii di Bologna, Viale Risorgimento 4, 1-40136 Bologna, Italy Feb.-Mar. 1991, pp. 295-299, XP-002516206.
BR Office Action dated Feb. 25, 2025 of counterpart Brazilian Patent Application No. BR112023005608-0.
IN Office Action dated Feb. 28, 2025 of counterpart Indian Patent Application No. 202317022528.

* cited by examiner

PHENOTHIAZINE COMPOUND, ITS PREPARATION AND USE IN RUBBER BLENDS AND VEHICLE TIRES, AS AGEING PROTECTANT, ANTIOXIDANT, ANTIOZONANT AND COLORANT

The invention relates to a compound, to a rubber mixture containing the compound, to a vehicle tire comprising the rubber mixture in at least one component, to a process for producing the compound and to the use of the compound as an aging stabilizer and/or antioxidant and/or antiozonant and/or dye.

It is known that vehicle tires and technical rubber articles employ polymeric materials such as especially rubbers.

In case of prolonged storage and especially in the target application, which is often at elevated temperatures, natural rubber and synthetic polymers (such as IR, BR, SBR, ESBR, etc.), but also natural and synthetic oils, fats and lubricants, are subject to oxidation reactions which have an adverse effect on the original, desired properties. Depending on the type of the polymer, the polymer chains are shortened right up to the liquefaction of the material or subsequent hardening of the material occurs.

Aging stabilizers thus play a decisive role in the durability of vehicle tires and other technical rubber articles.

Known aging stabilizers are aromatic amines, for example 6-PPD (N-(1,3-dimethylbutyl)-N'-phenyl-p-phenylenediamine), IPPD (N-isopropyl-N'-phenyl-p-phenylenediamine) or SPPD (N-(1-phenylethyl)-N'-phenyl-p-phenylenediamine).

These molecules can react with oxygen or ozone or free radicals formed, such as alkyl and alkylperoxy radicals, and thus scavenge these and accordingly protect the rubbers etc. from further oxidation reactions.

However, aromatic amines have the disadvantage that they are suspected to be carcinogenic and thus hazardous to health, in particular since aniline or derivatives thereof can be liberated.

In addition the solubility of the aging stabilizers in the medium to be protected must be taken into account. Aging stabilizers such as IPPD have the disadvantage that they are in some cases poorly soluble in rubbers and thus migrate to the surface and there form a film which is usually colored. This effect is known as "blooming"; the aging stabilizer blooms out of the respective rubber. In addition to appearance this also has the disadvantage that the aging stabilizer bloomed is removed by rain for example, as a result of which a film is re-formed by further migrating molecules, thus causing the concentration of the aging stabilizer in the medium to be protected to continuously decrease. This results in a poorer protective effect than in the case without blooming and loss of the aging stabilizer.

Aging stabilizers which especially react with ozone and effect scavenging thereof are also referred to as "antiozonants".

It is an object of the invention to provide a compound usable in particular as an aging stabilizer in vehicle tires or other technical rubber articles in order thus to achieve an improved protective effect on these articles based on the prior art. In particular, the blooming behavior should be improved and at the same time a compound which is less hazardous to health in comparison with the prior art (aromatic amines) should be provided.

The object is achieved by the inventive compound according to claim 1, by the inventive rubber mixture containing the compound and also by the inventive vehicle tire comprising the inventive rubber mixture in at least one component. The object is further achieved by the process for producing the compound and by the use of the compound as an aging stabilizer and/or antioxidant and/or antiozonant.

The compound according to claim 1 may further be used as a dye.

The compound according to claim 1 has the formula I):

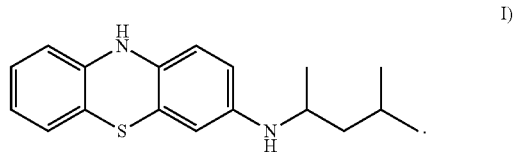 [SMILES: CC(C)CC(C)Nc1ccc2c(c1)Sc1ccccc1N2]

The compound of formula I) is accordingly 3-(1,3-dimethylbutylamino)phenothiazine.

The compound of formula I) is a phenothiazine derivative. Phenothiazine/derivatives thereof are inter alia used as a medicament, for example for treatment of Parkinson's disease, see US 20130315825 A1, and are less hazardous to health compared to aromatic amines, such as 6PPD or IPPD.

However, phenothiazine itself is not as readily soluble in polymers, such as rubbers of vehicle tires or other technical rubber articles, thus resulting in the described blooming problem. The compound according to the invention therefore has the advantage of better protective effect compared to phenothiazine.

Simultaneously the compound according to the invention of formula I) exhibits an improved protective effect compared to known aging stabilizers such as 6PPD in particular which is thought to be attributable to an elevated reactivity toward free radicals for example. However, the invention shall not be bound to a particular mechanism of action or a particular explanation.

U.S. Pat. No. 3,413,291 discloses phenothiazine derivatives. However, the derivatives disclosed therein are likewise not readily soluble in rubbers, for example N-isopropyl-10H-phenothiazine-3-amine. The inventive compound of formula I) thus exhibits a better solubility in polymers, such as rubbers, and thus an improved protective effect, compared to known phenothiazine derivatives on account of the 1,3-dimethylbutyl group.

CN 108069874 likewise discloses aging stabilizers based on phenothiazine derivatives. However, the derivatives disclosed therein are simultaneously Schiff bases with the moiety $R^2C=NR'$ (R' is not H, hydrogen) as shown for example in formula S1) on account of the substituents.

These substances are susceptible to hydrolysis and exhibit a lower protective effect, presumably since there is no $sp^3$-hybridized α-H atom (alpha-hydrogen atom) in the vicinity of the phenyl-N group, as shown in S2).

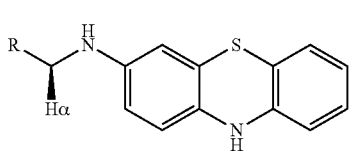

S2)

Compared to such Schiff base phenothiazine derivatives, such as the compound of formula S1) the inventive compound of formula I) thus has the advantages that it is more stable, not susceptible to hydrolysis and allows a better protective effect.

CN 106590827 discloses a phenothiazine derivative of formula S3):

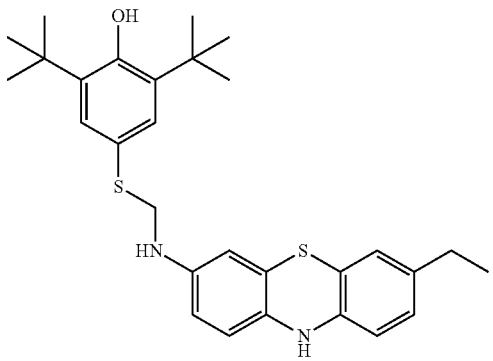

S3)

However, the compound of formula S3) has the disadvantage of the —S—CH$_2$—NH-moiety which, for example in rubber mixtures for vehicle tires, can form/liberate thiols due to the susceptibility to hydrolysis, which can cause undesired pre-crosslinking (scorch) of the rubber mixture.

CN 105272892 discloses aging stabilizers as shown in formula S4) where phenol derivatives are connected with phenothiazine units via a thioacetate and amide linker. These linker units too are not advantageous for use in rubber mixtures to be vulcanized since thioacetates are capped mercaptans which decompose during the vulcanization and for example can undergo bonding with the diene-containing rubber. Furthermore, the amide moiety lacks α-H atoms which—as described above in relation to formula S1)—reduces the effect of the aging stabilizers.

S4)

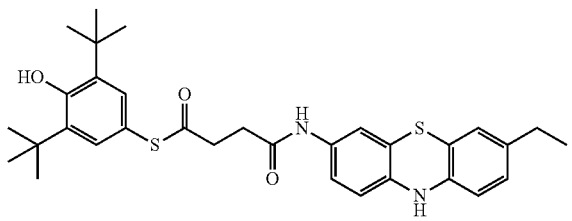

CN 107935867 discloses aging stabilizers as shown in formula S5) which exhibit a free amine group (—NH$_2$). This increases in a rubber mixture, for example for vehicle tires or other technical rubber articles, the risk of premature crosslinking, which is also referred to as "scorching".

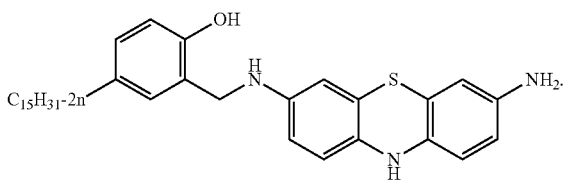

S5)

The inventive compound of formula I) is particularly suitable as an aging stabilizer and/or antiozonant in vehicle tires and/or technical rubber articles, such as in particular an air spring, bellows, conveyor belt, belt, drive belt, hose, rubber band, profile, a seal, a membrane, tactile sensors for medical applications or robotics applications, or a shoe sole or parts thereof and/or oils and/or lubricants.

The inventive compound of formula I) is particularly suitable for producing a rubber article, in particular an air spring, a bellows, conveyor belt, belt, drive belt, hose, rubber band, profile, a seal, a membrane, tactile sensors for medical applications or robotics applications, or a shoe sole or parts thereof.

To use the compound according to formula I) in the recited articles or substances, said compound is used in a composition and used incorporated in said composition.

In vehicle tires or other technical rubber articles, this is in particular a rubber mixture.

The invention further provides for the use of the compound according to the invention of formula I) in oils and lubricants, such as in particular fuels or fluids for engines. The compound according to the invention may accordingly be employed in engines.

The present invention further provides for the use of the inventive compound according to formula I) as a dye in fibers and/or polymers and/or paper and/or in paints and coatings.

The present invention thus further provides a rubber mixture as mentioned above.

The rubber mixture according to the invention contains the compound of formula I). The rubber mixture according to the invention may in principle be any rubber mixture in which the novel inventive compound of formula I) achieves improved properties, in particular increased durability through aging stabilization and/or antiozonant effect.

The rubber mixture of the invention contains at least one rubber.

It is preferable when the rubber mixture according to the invention contains 0.1 to 10 phr, particularly preferably 0.1 to 5 phr, very particularly preferably 1 to 5 phr, of the compound of formula I).

The unit "phr" (parts per hundred parts of rubber by weight) used in this document is the conventional indication of quantity for mixture recipes in the rubber industry. The dosage of the parts by weight of the individual substances is based in this document on 100 parts by weight of the total mass of all high molecular weight (Mw greater than 20 000 g/mol) and hence solid rubbers present in the mixture.

Figures 1A, 1B:
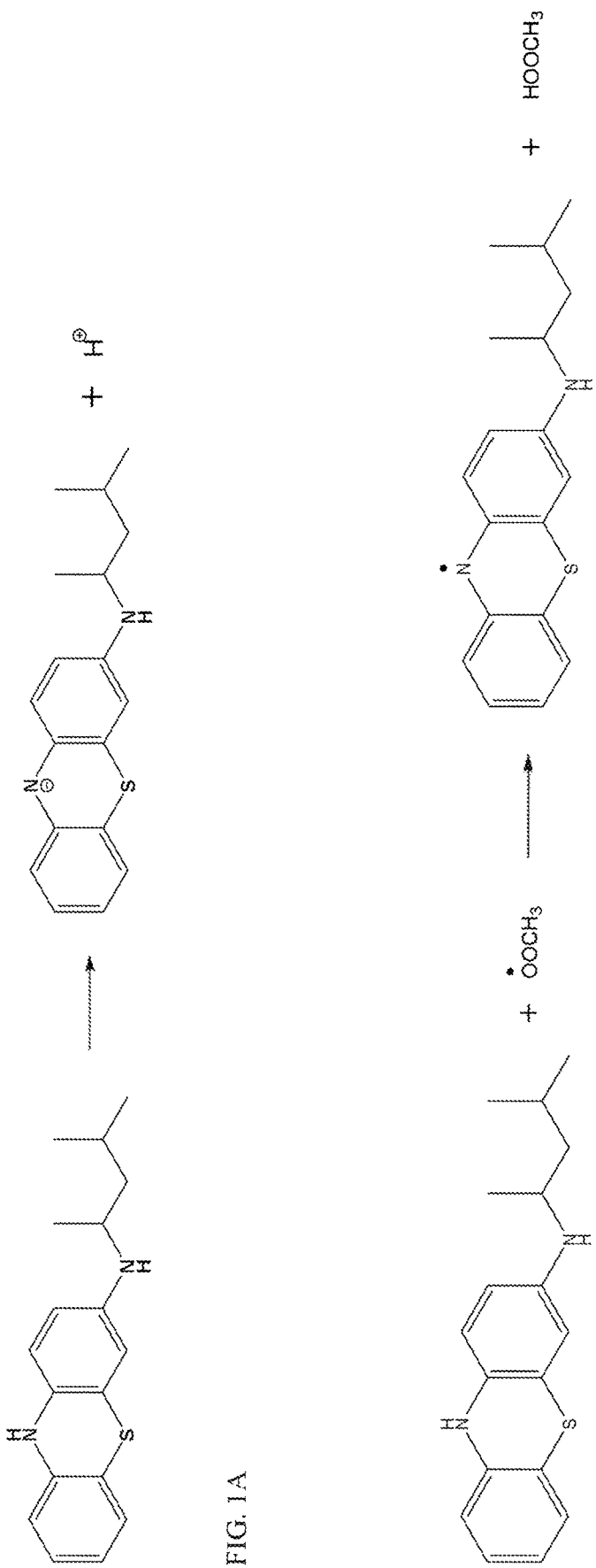
FIGS. 1a and 1b show cleavage mechanisms to which the values in Table 2 relate.

In advantageous embodiments of the invention, the rubber mixture according to the invention contains at least one diene rubber.

The rubber mixture may accordingly contain a diene rubber or a mixture of two or more different diene rubbers.

Diene rubbers are rubbers which are formed by polymerization or copolymerization of dienes and/or cycloalkenes and thus have C=C double bonds either in the main chain or in the side groups.

The diene rubber is preferably selected from the group consisting of natural polyisoprene (NR), synthetic polyisoprene (IR), epoxidized polyisoprene (ENR), butadiene rubber (BR), butadiene-isoprene rubber, solution-polymerized styrene-butadiene rubber (SSBR), emulsion-polymerized styrene-butadiene rubber (ESBR), styrene-isoprene rubber, liquid rubbers having a molecular weight MW of more than 20 000 g/mol, halobutyl rubber, polynorbornene, isoprene-isobutylene copolymer, ethylene-propylene-diene rubber, nitrile rubber, chloroprene rubber, acrylate rubber, fluororubber, silicone rubber, polysulfide rubber, epichlorohydrin rubber, styrene-isoprene-butadiene terpolymer, hydrogenated acrylonitrile butadiene rubber and hydrogenated styrene-butadiene rubber.

Nitrile rubber, hydrogenated acrylonitrile-butadiene rubber, chloroprene rubber, butyl rubber, halobutyl rubber and/or ethylene-propylene-diene rubber in particular are used in the production of technical rubber articles, such as belts, drive belts and hoses, and/or shoe soles. The mixture compositions known to those skilled in the art for these rubbers, which are specific in terms of fillers, plasticizers, vulcanization systems and additives, are preferably employed.

The natural and/or synthetic polyisoprene of all embodiments may be either cis-1,4-polyisoprene or 3,4-polyisoprene. However, the use of cis-1,4-polyisoprenes having a cis-1,4 proportion of >90% by weight is preferred. Such a polyisoprene is firstly obtainable by stereospecific polymerization in solution with Ziegler-Natta catalysts or using finely divided lithium alkyls. Secondly, natural rubber (NR) is one such cis-1,4-polyisoprene, for which the cis-1,4 content in the natural rubber is greater than 99% by weight.

A mixture of one or more natural polyisoprenes with one or more synthetic polyisoprenes is further also conceivable.

In the context of the present invention, the term "natural rubber" is to be understood as meaning naturally occurring rubber which may be obtained from Hevea rubber trees and from "non-Hevea" sources. Non-Hevea sources include for example Guayule shrubs and dandelion such as for example TKS (Taraxacum kok-saghyz; Russian dandelion).

If the rubber mixture of the invention contains butadiene rubber (i.e. BR, polybutadiene), this may be any of the types known to those skilled in the art. These include what are called the high-cis and low-cis types, with polybutadiene having a cis content of not less than 90% by weight being referred to as the high-cis type and polybutadiene having a cis content of less than 90% by weight being referred to as the low-cis type. An example of a low-cis polybutadiene is Li—BR (lithium-catalyzed butadiene rubber) having a cis content of 20% to 50% by weight. Particularly good properties and low hysteresis of the rubber mixture are achieved with a high-cis BR.

The polybutadiene(s) employed may be end group-modified with modifications and functionalizations and/or be functionalized along the polymer chains. The modification may be selected from modifications with hydroxyl groups and/or ethoxy groups and/or epoxy groups and/or siloxane groups and/or amino groups and/or aminosiloxane and/or carboxyl groups and/or phthalocyanine groups and/or silane-sulfide groups. However, other modifications known to those skilled in the art, also known as functionalizations, are also suitable. Metal atoms may be a constituent of such functionalizations.

In the case where at least one styrene-butadiene rubber (styrene-butadiene copolymer) is present in the rubber mixture, this may be either solution-polymerized styrene-butadiene rubber (SSBR) or emulsion-polymerized styrene-butadiene rubber (ESBR), a mixture of at least one SSBR and at least one ESBR also being employable. The terms "styrene-butadiene rubber" and "styrene-butadiene copolymer" are used synonymously in the context of the present invention.

The styrene-butadiene copolymer used may be end group-modified and/or functionalized along the polymer chains with the modifications and functionalizations recited above for the polybutadiene.

The at least one diene rubber is preferably selected from the group consisting of natural polyisoprene (NR, natural rubber), synthetic polyisoprene (IR), butadiene rubber (BR), solution-polymerized styrene-butadiene rubber (SSBR), emulsion-polymerized styrene-butadiene rubber (ESBR), butyl rubber (IIR) and halobutyl rubber.

In a particularly preferred embodiment of the invention, the at least one diene rubber is selected from the group consisting of natural polyisoprene (NR), synthetic polyisoprene (IR), butadiene rubber (BR), solution-polymerized styrene-butadiene rubber (SSBR) and emulsion-polymerized styrene-butadiene rubber (ESBR).

In a particularly advantageous embodiment of the invention, the rubber mixture comprises at least one natural polyisoprene (NR), preferably in amounts of 5 to 55 phr, and in one particularly advantageous embodiment of the invention 5 to 25 phr, very particularly preferably 5 to 20 phr. Such a rubber mixture exhibits good processability and reversion stability and optimized tear properties and optimal rolling resistance characteristics.

In a particularly advantageous embodiment of the invention, the rubber mixture comprises at least one polybutadiene (BR, butadiene rubber), preferably in amounts of 10 to 80 phr, particularly preferably 10 to 50 phr, and in a particularly advantageous embodiment of the invention 15 to 40 phr. This achieves particularly good tear and abrasion properties of the rubber mixture according to the invention and optimal braking characteristics.

In a particularly advantageous embodiment of the invention, the rubber mixture comprises at least one solution-polymerized styrene-butadiene rubber (SSBR), preferably in amounts of 10 to 80 phr, particularly preferably 30 to 80 phr, and in one particularly advantageous embodiment of the invention 50 to 70 phr. This achieves particularly good rolling resistance properties of the rubber mixture according to the invention. In particularly advantageous embodiments of the invention, SSBR is employed in combination with at least one further rubber to achieve an optimal and balanced profile of properties.

It is preferable when the rubber mixture contains at least one filler, preferably in amounts of 30 to 500 phr, particularly preferably 50 to 400 phr, in turn preferably 80 to 300 phr.

In advantageous embodiments of the invention, the filler is a reinforcing filler which is preferably selected from the group consisting of carbon blacks and silicas.

In particularly advantageous embodiments of the invention, the rubber mixture contains at least one silica as filler, preferably in amounts of 30 to 500 phr, particularly preferably 50 to 400 phr, in turn preferably 80 to 300 phr.

In these quantities, silica is especially present as the sole or primary filler (more than 50% by weight based on total filler amount).

In further advantageous embodiments of the invention, the rubber mixture contains at least one silica as a further filler, preferably in amounts of 5 to 100 phr, particularly preferably 5 to 80 phr, in turn preferably 10 to 60 phr.

In these quantities, silica is especially present as a further filler in addition to another primary filler, such as in particular a carbon black.

The silica may be any of the types of silica known to those skilled in the art that are suitable as filler for tire rubber mixtures. However, particular preference is given to using a finely divided, precipitated silica which has a nitrogen surface area (BET surface area) (in accordance with DIN ISO 9277 and DIN 66132) of 35 to 400 $m^2/g$, preferably 35 to 350 $m^2/g$, more preferably 85 to 320 $m^2/g$ and most preferably 120 to 235 $m^2/g$, and a CTAB surface area (in accordance with ASTM D 3765) of 30 to 400 $m^2/g$, preferably 30 to 330 $m^2/g$, more preferably 80 to 300 $m^2/g$ and most preferably 115 to 200 $m^2/g$. Such silicas lead, for example in rubber mixtures for tire treads, to particularly good physical properties of the vulcanizates. Advantages in mixture processing by way of a reduction in mixing time can also result here while retaining the same product properties, leading to improved productivity. Silicas used may thus, for example, be either those of the Ultrasil® VN3 type (trade name) from Evonik or highly dispersible silicas known as HD silicas (e.g. Zeosil® 1165 MP from Solvay).

Where at least two different silicas, differing, for example, in their BET surface area, are present in the rubber mixture of the invention, the quantity figures stated refer to the total amount of all silicas present.

The terms "silicic acid" and "silica" are used synonymously in the context of the present invention.

The rubber mixture may additionally contain further fillers, such as in particular carbon blacks, in particular industrial carbon blacks or pyrolysis carbon blacks, or further reinforcing or non-reinforcing fillers.

Within the context of the present invention, the further (non-reinforcing) fillers include aluminosilicates, kaolin, chalk, starch, magnesium oxide, titanium dioxide, or rubber gels and also fibers (for example aramid fibers, glass fibers, carbon fibers, cellulose fibers).

Further, optionally reinforcing, fillers are for example carbon nanotubes (CNTs), including discrete CNTs, hollow carbon fibers (HCF) and modified CNTs containing one or more functional groups such as hydroxy, carboxy and carbonyl groups), graphite and graphenes and what is known as "carbon-silica dual-phase filler".

In the context of the present invention, zinc oxide is not included among the fillers.

In particularly advantageous embodiments of the invention, the rubber mixture according to the invention contains 0.1 to 60 phr, preferably 3 to 40 phr, particularly preferably 5 to 30 phr, very particularly preferably 5 to 15 phr, of at least one carbon black. In these quantities, carbon black is present especially as a further filler in addition to a primary filler, such as in particular silica.

In further advantageous embodiments of the invention, the rubber mixture according to the invention contains 30 to 300 phr, preferably 30 to 200 phr, particularly preferably 40 to 100 phr, of at least one carbon black. In these quantities, carbon black is present as the sole or primary filler and is therefore optionally present in combination with silica in the abovementioned smaller amounts.

Suitable carbon blacks include any carbon black types familiar to those skilled in the art.

In one embodiment, the carbon black has an iodine number according to ASTM D 1510, also known as the iodine adsorption number, between 30 and 250 g/kg, preferably 30 to 180 g/kg, particularly preferably 40 to 180 g/kg, and very particularly preferably 80 to 150 g/kg, and a DBP number according to ASTM D 2414 of 30 to 200 ml/100 g, preferably 70 to 200 ml/100 g, particularly preferably 90 to 200 ml/100 g.

The DBP number in accordance with ASTM D 2414 determines the specific absorption volume of a carbon black or a light-colored filler by means of dibutyl phthalate.

The use of such a type of carbon black in the rubber mixture, in particular for vehicle tires, ensures the best possible compromise between abrasion resistance and heat buildup, which in turn influences the ecologically relevant rolling resistance. Preference is given here to only one type of carbon black being used in the respective rubber mixture, but it is also possible to mix various types of carbon black into the rubber mixture.

In a particularly advantageous embodiment of the invention, the rubber mixture contains 5 to 60 phr, particularly preferably 5 to 40 phr, of at least one carbon black and 50 to 300 phr, preferably 80 to 200 phr, of at least one silica.

The rubber mixture can further contain customary additives in customary parts by weight which are added preferably in at least one primary mixing stage during the production of said mixture. These additives include a) aging stabilizers known in the prior art, for example diamines, such as N-Phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-(1,4-dimethylpentyl)-N'-phenyl-p-phenylenediamine (7PPD), N-isopropyl-N'-phenyl-p-phenylenediamine (IPPD), or dihydroquinolines, such as 2,2,4-trimethyl-1,2-dihydroquinoline (TMQ), b) activators, for example zinc oxide and fatty acids (e.g. stearic acid) and/or other activators, such as zinc complexes, for example zinc ethylhexanoate, c) activators and/or agents for binding fillers, in particular carbon black or silica, for example S-(3-aminopropyl) thiosulfuric acid and/or metal salts thereof (bonding of carbon black) and silane coupling agents (bonding of silica), d) antiozonant waxes, e) resins, especially tackifying resins for internal tire components, f) masticating aids, for example 2,2'-dibenzamidodiphenyl disulfide (DBD), and g) processing aids, such as in particular fatty acid esters and metal soaps, for example zinc soaps and/or calcium soaps, h) plasticizers, such as in particular aromatic, naphthenic or paraffinic mineral oil plasticizers, for example MES (mild extraction solvate) or RAE (residual aromatic extract) or TDAE (treated distillate aromatic extract), or rubber-to-liquid oils (RTL) or biomass-to-liquid oils (BTL) preferably having a content of polycyclic aromatics of less than 3% by weight according to method IP 346 or triglycerides, for example rapeseed oil or factices or hydrocarbon resins or liquid polymers having a mean molecular weight (determination by GPC=gel permeation chromatography, in accordance with BS ISO 11344:2004) between 500 and 20 000 g/mol.

When using mineral oil, this is preferably selected from the group consisting of DAE (distillate aromatic extracts) and/or RAE (residual aromatic extract) and/or TDAE (treated distillate aromatic extracts) and/or MES (mild extracted solvents) and/or naphthenic oils.

In particularly advantageous embodiments, the rubber mixture according to the invention contains no further aging stabilizers from the group of p-phenylenediamines, see above list a), in addition to the inventive compounds of formula I). In a particularly preferred embodiment, the rubber mixture according to the invention especially contains 0 to 0.1 phr, in particular 0 phr, of further aging stabilizers based on diamines selected from the group containing, particularly preferably consisting of, N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD), N-(1,4-dimethylpentyl)-N'-phenyl-p-phenylenediamine (7PPD).

The preferably very small amounts of 0 to 0 phr, particularly preferably 0 phr, of the abovementioned diamines and of the compound of formula I) present according to the invention make it possible to achieve an improved protective effect. The inventive compound of formula I) replaces the recited diamines known in the prior art.

In further advantageous embodiments of the invention, at least one further representative of the recited diamine aging stabilizers is present and therefore the compound according to the invention only partially replaces the diamines known in the prior art. This also achieves the advantage according to the invention, just not to an optimal extent.

In advantageous embodiments, aging stabilizers based on dihydroquinoline, such as TMQ, are present in the rubber mixture in addition to the inventive compound of formula I). The amount of dihydroquinolines present, such as especially TMQ, is preferably 0.1 to 3, in particular 0.5 to 1.5 phr.

In further advantageous embodiments, the rubber mixture according to the invention contains no further aging stabilizers, i.e. 0 phr of further aging stabilizers other than the inventive compound of formula I).

The silane coupling agents may be any of the types known to those skilled in the art.

Furthermore, one or more different silane coupling agents may be used in combination with one another. The rubber mixture may thus contain a mixture of different silanes.

The silane coupling agents react with the surface silanol groups of the silica or other polar groups during the mixing of the rubber/the rubber mixture (in situ) or in the context of a pretreatment (premodification) even before addition of the filler to the rubber.

Coupling agents known from the prior art are bifunctional organosilanes having at least one alkoxy, cycloalkoxy or phenoxy group as a leaving group on the silicon atom and having as another functionality a group which, possibly after cleavage, can enter into a chemical reaction with the double bonds of the polymer.

The latter group may for example comprise the following chemical groups: —SCN, —SH, —NH$_2$ or —S$_x$— (with x=2 to 8).

Employable silane coupling agents thus include for example 3-mercaptopropyltriethoxysilane, 3-thiocyanatopropyltrimethoxysilane or 3,3'-bis(triethoxysilylpropyl) polysulfides having 2 to 8 sulfur atoms, for example 3,3'-bis(triethoxysilylpropyl) tetrasulfide (TESPT), the corresponding disulfide (TESPD), or else mixtures of the sulfides having 1 to 8 sulfur atoms with different contents of the various sulfides. TESPT may for example also be added as a mixture with carbon black (trade name X50S® from Evonik).

Blocked mercaptosilanes as known for example from WO 99/09036 may also be used as a silane coupling agent. It is also possible to use silanes as described in WO 2008/083241 A1, WO 2008/083242 A1, WO 2008/083243 A1 and WO 2008/083244 A1. It is also possible to use, for example, silanes which are marketed under the name NXT in a number of variants from Momentive, USA, or those which are marketed under the name VP Si 363® by Evonik Industries.

The total proportion of further additives is preferably 3 to 150 phr, more preferably 3 to 100 phr and most preferably 5 to 80 phr.

Zinc oxide (ZnO) may be included in the total proportion of the further additives in the abovementioned amounts.

This may be any type of zinc oxide known to those skilled in the art, for example ZnO granules or powder. The zinc oxide conventionally used generally has a BET surface area of less than 10 m$^2$/g. However, it is also possible to use a zinc oxide having a BET surface area of 10 to 100 m$^2$/g, for example so-called "nano zinc oxides".

The rubber mixture according to the invention is preferably used in vulcanized form, in particular in vehicle tires or other vulcanized technical rubber articles.

The vulcanization of the rubber mixture of the invention is preferably conducted in the presence of sulfur and/or sulfur donors with the aid of vulcanization accelerators, it being possible for some vulcanization accelerators to act simultaneously as sulfur donors. The accelerator is selected from the group consisting of thiazole accelerators and/or mercapto accelerators and/or sulfenamide accelerators and/or thiocarbamate accelerators and/or thiuram accelerators and/or thiophosphate accelerators and/or thiourea accelerators and/or xanthogenate accelerators and/or guanidine accelerators.

Preference is given to using a sulfenamide accelerator selected from the group consisting of N-cyclohexyl-2-benzothiazolesulfenamide (CBS) and/or N,N-dicyclohexylbenzothiazole-2-sulfenamide (DCBS) and/or benzothiazyl-2-sulfenomorpholide (MBS) and/or N-tert-butyl-2-benzothiazylsulfenamide (TBBS) or a guanidine accelerator such as diphenylguanidine (DPG).

The sulfur donor substances used may be any sulfur donor substances known to those skilled in the art. If the rubber mixture contains a sulfur donor substance, the latter is preferably selected from the group comprising for example thiuram disulfides, for example tetrabenzylthiuram disulfide (TBzTD) and/or tetramethylthiuram disulfide (TMTD) and/or tetraethylthiuram disulfide (TETD), and/or thiuram tetrasulfides, for example dipentamethylenethiuram tetrasulfide (DPTT), and/or dithiophosphates, for example DipDis (bis(diisopropyl)thiophosphoryl disulfide) and/or bis(O,O-2-ethylhexylthiophosphoryl) polysulfide (e.g. Rhenocure SDT 50®, Rheinchemie GmbH) and/or zinc dichloryldithiophosphate (e.g. Rhenocure ZDT/S®, Rheinchemie GmbH) and/or zinc alkyldithiophosphate, and/or 1,6-bis(N,N-dibenzylthiocarbamoyldithio)hexane and/or diaryl polysulfides and/or dialkyl polysulfides.

Further network-forming systems, such as can be obtained for example under the trade names Vulkuren®, Duralink® or Perkalink®, or network-forming systems as described in WO 2010/049216 A2, can also be used in the rubber mixture. This system contains a vulcanizing agent which crosslinks with a functionality of greater than four and at least one vulcanization accelerator.

It is particularly preferable to use the accelerators TBBS and/or CBS and/or diphenylguanidine (DPG).

Vulcanization retarders may also be present in the rubber mixture.

The terms "vulcanized" and "crosslinked" are used synonymously in the context of the present invention.

In a preferred development of the invention, a plurality of accelerators are added in the final mixing stage during the production of the sulfur-crosslinkable rubber mixture.

The sulfur-crosslinkable rubber mixture of the invention is produced by the process that is customary in the rubber industry, in which, in one or more mixing stages, a base mixture comprising all constituents except for the vulcanization system (sulfur and vulcanization-influencing substances) is first produced. The finished mixture is produced by adding the vulcanization system in a final mixing stage. The finished mixture is for example processed further and brought into the appropriate shape by means of an extrusion operation or calendering.

This is followed by further processing by vulcanization, wherein sulfur crosslinking takes place due to the vulcanization system added within the context of the present invention.

The above-described rubber mixture of the invention is particularly suitable for use in vehicle tires, especially pneumatic vehicle tires.

For use in vehicle tires, the mixture, as a finished mixture prior to vulcanization, is preferably brought into the shape of a tread and is applied in the known manner during production of the green vehicle tire.

The production of the rubber mixture of the invention, for use as a sidewall or other body mixture in vehicle tires, is effected as has already been described. The difference lies in the shaping after the extrusion operation/the calendering of the mixture. The shapes thus obtained of the as-yet unvulcanized rubber mixture for one or more different body mixtures then serve for the construction of a green tire.

"Body mixture" refers here to the rubber mixtures for the inner components of a tire, such as essentially squeegee, inner liner (inner layer), core profile, belt, shoulder, belt profile, carcass, bead reinforcement, bead profile, flange profile and bandage. The as-yet unvulcanized green tire is subsequently vulcanized.

For use of the rubber mixture of the invention in drive belts and other belts, especially in conveyor belts, the extruded, as-yet unvulcanized mixture is brought into the appropriate shape and often provided at the same time or subsequently with strength members, for example synthetic fibers or steel cords. This usually affords a multi-ply construction consisting of one and/or more plies of rubber mixture, one and/or more plies of identical and/or different strength members and one and/or more further plies of the same and/or another rubber mixture.

The present invention further provides a vehicle tire comprising the rubber mixture according to the invention containing the compound according to the invention in at least one component.

The vulcanized vehicle tire comprises at least in one component a vulcanizate of at least one rubber mixture according to the invention. A person skilled in the art is aware that most of the substances, for example the rubbers present, are present in a chemically altered form either already after mixing or only after vulcanization.

Within the context of the present invention, "vehicle tires" are to be understood to mean pneumatic vehicle tires and solid rubber tires, including tires for industrial and construction site vehicles, truck, car and two-wheeled-vehicle tires.

The vehicle tire according to the invention preferably comprises the rubber mixture according to the invention in at least one external component, wherein the external component is preferably a tread, a sidewall and/or a flange profile.

The vehicle tire according to the invention may thus also comprise the rubber mixture according to the invention containing the inventive compound of formula I) in two or more components of optionally adapted composition.

The present invention further provides a process for producing the compound of formula I), wherein the process comprises at least the following process steps:

a) providing the substance of formula A)

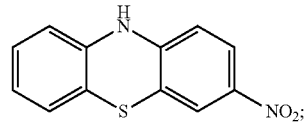

b) providing methyl isobutyl ketone (MIBK) and hydrogen (H2);
c) reacting the substance according to step a) with the substances according to step b), preferably in the presence of a hydrogenation catalyst, to afford the substance of formula I)

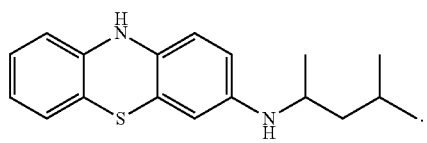

The present invention further provides a further process for producing the compound of formula I), wherein the process comprises at least the following process steps:

a1) providing the substance of formula A)

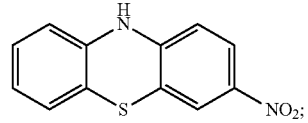

b1) providing a reducing agent, in particular tin(II) chloride dihydrate;
c1) reacting the substance according to step a1) with the substance from step b1) to afford the substance of formula C1)

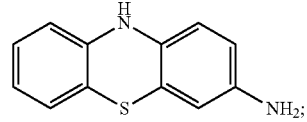

d1) providing methyl isobutyl ketone (MIBK) and hydrogen ($H_2$);

e1) reacting the substance of formula C1) with the substances according to step d1), preferably in the presence of a hydrogenation catalyst, to afford the substance of formula I)

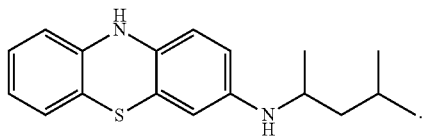

The substance methyl isobutyl ketone (MIBK) is commercially available.

The reducing agent may be any reducing agent which is known to a person skilled in the art and is suitable for reducing the nitro group (NO$_2$) to an amino group (—NH$_2$). Tin(II) chloride dihydrate is especially suitable. This is commercially available.

The process of steps a) to c) is preferable relative to the process of steps a1) to e1) since fewer process steps are necessary.

It is preferable when the process steps in which a reaction with hydrogen is carried out employ a suitable catalyst, referred to in the context of the present invention as "hydrogenation catalyst".

The hydrogenation catalyst of the processes (step c)/e1)) is preferably a noble metal catalyst, such as in particular palladium (Pd) or platinum (Pt). The noble metal is preferably employed on carbon (C), such as palladium on carbon (Pd/C) or platinum on carbon (Pt/C).

It is also possible to employ other known catalysts, such as Raney nickel or copper chromite.

It is preferable when Pt/C is used in step c).

It is preferable when Pd/C is used in step e1).

The hydrogen pressure in the respective process steps in which hydrogen is used is preferably 1 to 50 bar, particularly preferably 10 to 45 bar. According to an advantageous embodiment of the invention a pressure of 20 to 40 bar is preferred.

The hydrogenation reaction in step c)/e1) is preferably carried out in an autoclave, in particular a stainless steel autoclave.

The temperature in process steps c) and e1) is preferably from room temperature (RT, in particular 20° C.) to 150° C., preferably to 130° C.

The present invention further provides a further process for producing the compound of formula I), wherein the process comprises at least the following process steps:

a2) providing the substance of formula A2):

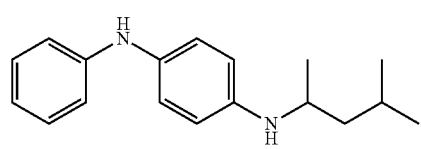

b2) providing elemental sulfur and o-dichlorobenzene (ortho-dichlorobenzene);

c2) reacting the substance of step a2) with the substances of step b2) to afford the substance of formula I)

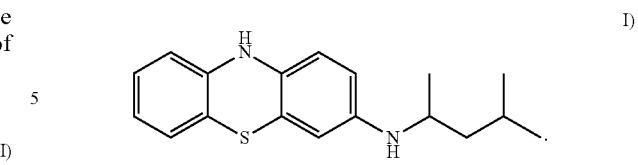

The invention shall be more particularly elucidated below with reference to working examples.

The component of formula I) was produced as follows:
X1): Synthesis of the Inventive Compound of Formula I) (3-(1,3-Dimethylbutylamino)Phenothiazine) According to Process Steps a) to c):

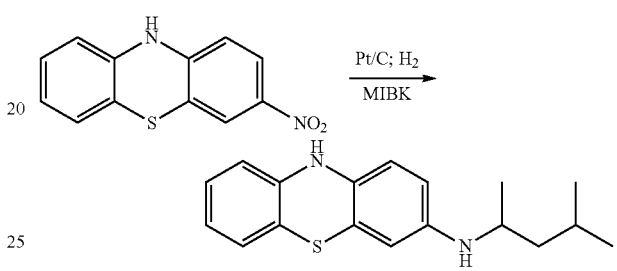

0.50 g (2.05 mmol, 1 eq.) of 3-nitrophenothiazine, 0.18 g of platinum on carbon (5%) (0.4 g on 4.67 mmol of substrate) and 20.0 mL of methyl isobutyl ketone were weighed into a stainless steel autoclave fitted with a Teflon inliner. The autoclave was then pressurized to 40 bar with hydrogen and stirred at 120° C. for 10 hours. After termination of the reaction, the excess hydrogen was blown off and the suspension filtered through diatomaceous earth (Celite®) and washed with ethanol. The filtrate was concentrated to dryness and dried under vacuum. Grayish to violet solid, yield 0.57 g (93% of theory).

$^1$H-NMR (500 MHz, DMSO-d6) δ=8.09 (s, 1H), 6.94 (td, J=7.6, 1.5 Hz, 1H), 6.88 (dd, J=7.6, 1.4 Hz, 1H), 6.69-6.63 (m, 2H), 6.51 (d, J=8.4 Hz, 1H), 6.27 (dd, J=8.5, 2.5 Hz, 1H), 6.21 (d, J=2.5 Hz, 1H), 4.82 (d, J=8.9 Hz, 1H), 3.30 (dt, J=8.6, 6.5 Hz, 1H), 1.70 (dp, J=13.5, 6.7 Hz, 1H), 1.38 (dt, J=13.9, 7.1 Hz, 1H), 1.16 (dt, J=13.5, 6.8 Hz, 1H), 1.02 (d, J=6.1 Hz, 3H), 0.87 (dd, J=19.4, 6.6 Hz, 6H).

$^{13}$C-NMR (126 MHz, DMSO-d6) δ=144.5, 143.9, 131.8, 127.7, 126.6, 121.0, 117.6, 116.5, 115.8, 114.4, 112.1, 110.7, 46.5, 46.4, 25.0, 23.2, 23.0, 21.2.

ESI-MS (electrospray ionization mass spectrometry) [M+H]$^+$=299.

In a further experiment X2) the reaction was performed as described above but with the differences that while the autoclave was likewise pressurized to 40 bar with hydrogen the mixture was stirred for 3 hours at 40° C.

A similar yield is obtained, as shown in the following table 1.

TABLE 1

| No. | Temperature [° C.] | Pressure [bar] | Duration [h] | Yield [%] |
|---|---|---|---|---|
| X1 | 120 | 40 | 10 | 99 |
| X2 | 40 | 40 | 3 | 97 |

The starting substance 3-nitrophenothiazine, substance of formula A) according to the above description of the process, was produced according to the disclosure in US 20130315825 A1.

Alternatively, 3-nitrophenothiazine may be produced by a single-stage copper (Cu)-catalyzed synthesis as disclosed in WO 2017011531 A2 (p 217). It is further possible to obtain 3-nitrophenothiazine by an uncatalyzed reaction disclosed in S. Wu, W. Hu, S. Zhang, RSC Advances, 2016, 6(29), 24257-24260. It is further possible to obtain 3-nitrophenothiazine from phenothiazine by reaction with sodium nitrite as disclosed in WO 2007110627 A2.

Alternatively, the substance of formula I) was obtained starting from 3-nitrophenothiazine in a two-stage reaction according to process steps a1) to e1):

Synthesis of 3-aminophenothiazine

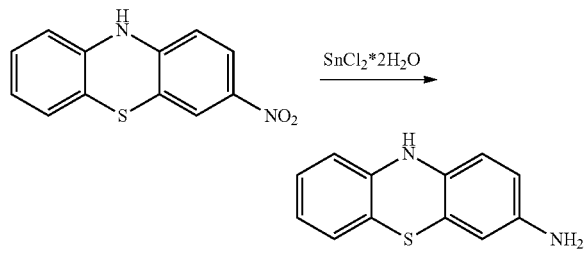

Under protective gas 22 g (90.0 mmol, 1.0 eq.) of 3-nitrophenothiazine were weighed in, dissolved in 800 mL of ethanol, admixed with 102 g (534 mmol, 5.0 eq) of tin(II) chloride dihydrate and stirred at boiling heat for 4 days. Once the reaction was brought to room temperature (RT), a third of the solvent was distilled off and the remainder poured onto ice. Subsequently, the pH of the mixture was adjusted to pH=7 using aqueous potassium hydroxide solution and extracted three times with ethyl acetate. The organic phase was washed with saturated NaCl solution and subsequently dried over $Na_2SO_4$. A brown solid was obtained, yield 18.9 g (98% of theory). $^1$H-NMR (500 MHz, DMSO-d6) δ=8.08 (s, 1H), 6.94 (td, J=7.7, 1.5 Hz, 1H), 6.88 (dd, J=7.7, 1.5 Hz, 1H), 6.71-6.60 (m, 2H), 6.46 (d, J=8.3 Hz, 1H), 6.32-6.22 (m, H), 4.64 (s, 2H).

ESI-MS [M+H]$^+$=215.

Synthesis of 3-(1,3-dimethylbutylamino)phenthiazine

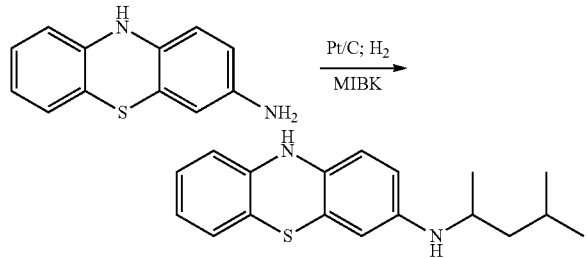

5.00 g (23.3 mmol, 1 eq.) of 3-aminophenothiazine, 2.00 g of palladium on carbon (5%) (0.4 g on 4.67 mmol of substrate) and 50.0 mL of methyl isobutyl ketone were weighed into a stainless steel autoclave fitted with a Teflon innerliner. The autoclave was then pressurized to 40 bar with hydrogen and stirred at 120° C. for 10 hours. After termination of the reaction, the excess hydrogen was blown off and the suspension filtered through diatomaceous earth (Celite®) and washed with ethanol. The filtrate was concentrated to dryness and dried under vacuum. Grayish to violet solid, yield 6.61 g (95% of theory).

$^1$H-NMR (500 MHz, DMSO-d6) δ=8.09 (s, 1H), 6.94 (td, J=7.6, 1.5 Hz, 1H), 6.88 (dd, J=7.6, 1.4 Hz, 1H), 6.69-6.63 (m, 2H), 6.51 (d, J=8.4 Hz, 1H), 6.27 (dd, J=8.5, 2.5 Hz, 1H), 6.21 (d, J=2.5 Hz, 1H), 4.82 (d, J=8.9 Hz, 1H), 3.30 (dt, J=8.6, 6.5 Hz, 1H), 1.70 (dp, J=13.5, 6.7 Hz, 1H), 1.38 (dt, J=13.9, 7.1 Hz, 1H), 1.16 (dt, J=13.5, 6.8 Hz, 1H), 1.02 (d, J=6.1 Hz, 3H), 0.87 (dd, J=19.4, 6.6 Hz, 6H).

$^{13}$C-NMR (126 MHz, DMSO-d6) δ=144.5, 143.9, 131.8, 127.7, 126.6, 121.0, 117.6, 116.5, 115.8, 114.4, 112.1, 110.7, 46.5, 46.4, 25.0, 23.2, 23.0, 21.2.

ESI-MS [M+H]$^+$=299.

Alternatively, the substance of formula I) was obtained in a single-stage reaction according to process steps a2) to c2):

Synthesis of 3-(1,3-dimethylbutylamino)-phenothiazine:

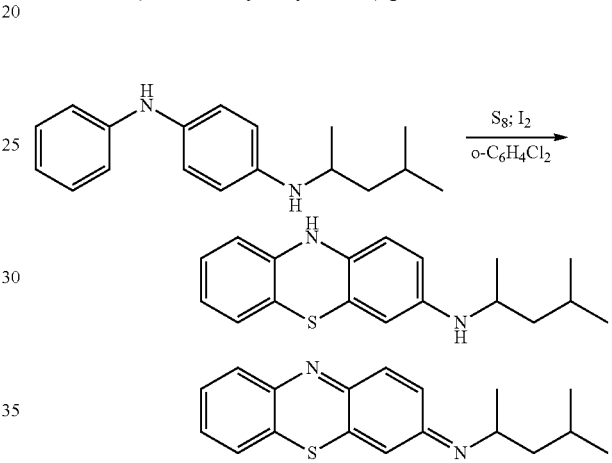

Under protective gas 10 g (37.3 mmol, 1 eq.) of 6-PPD (N-(1,3-dimethylbutyl)-N'-phenyl-p-phenylenediamine) were dissolved in 80 mL of degassed o-dichlorobenzene and admixed with 2.9 g (89 mmol, 2.4 eq based on monomeric "S") of sulfur and 0.95 g (3.73 mmol, 0.1 eq.) of iodine ($I_2$). The mixture was heated under reflux (180° C.) for 4 hours. Hydrogen sulfide formed was passed into a 5% NaOH solution. Once cooled to room temperature (RT) the mixture was admixed with dichloromethane (DCM) and a saturated $Na_2S_2O_3$ solution. The resulting black solid was removed by filtration and the organic phase separated from the aqueous phase. The organic phase was washed with saturated NaCl solution, dried over $Na_2SO_4$ and concentrated to dryness. The black solid was analyzed by LC-MS (liquid chromatography-mass spectrometry) with coupled UV-VIS spectroscopy (ultraviolet and visible spectroscopy). It contained 39% (E)-N-(4-methylpentan-2-yl)-3H-phenothiazin-3-imine as byproduct (lower molecule on the right hand side of the reaction arrow) and 24% undefined substances. The remaining 37% are composed of starting material and the inventive compound of formula I).

The inventive compound of formula I) exhibits an elevated reactivity relative to 6PPD. This was consistent for example with the calculation of binding dissociation energies (BDE), and the free activation enthalpy $Δ_RG^≠$ and the free standard reaction enthalpy $Δ_RG°$ for the reaction with a methyl peroxide radical. The values are reported in table 2. FIGS. 1a and 1b show the cleavage mechanisms to which the values relate:

TABLE 2

| Molecule | BDE [kJ/mol] | $\Delta_R G°$ [kJ/mol] | $\Delta_R G^{\neq}$ [kJ/mol] |
| --- | --- | --- | --- |
| 6PPD | 313 | −25.6 | 19.1 |
| Formula I) | 251 | −52.8 | 6.3 |

As is apparent from table 2, the inventive compound of formula I) exhibits a lower bond dissociation energy and lower free enthalpies.

The compound of formula I) thus makes it possible to achieve an improved protective effect in the recited applications.

For use in a rubber mixture for vehicle tires, the inventive compound of formula I) is added for example instead of the aging stabilizers known in the prior art, such as 6PPD, 7PPD or IPPD etc., in a manner known to those skilled in the art in one of the mixing stages in the production of the rubber mixture.

The invention claimed is:

1. A rubber mixture comprising a compound of formula I):

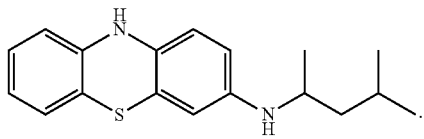

I)

2. The rubber mixture of claim 1, wherein the rubber mixture contains at least one diene rubber.

3. The rubber mixture of claim 1, wherein the rubber mixture contains at least one diene rubber selected from the group consisting of natural polyisoprene (NR), synthetic polyisoprene (IR), butadiene rubber (BR), solution-polymerized styrene-butadiene rubber (SSBR), emulsion-polymerized styrene-butadiene rubber (ESBR), butyl rubber (IIR), and halobutyl rubber.

4. The rubber mixture of claim 1, wherein the rubber mixture is part of a vehicle tire.

5. The rubber mixture of claim 4, wherein the rubber mixture is incorporated in a tread, a sidewall and/or a flange profile of the vehicle tire.

6. A method for producing a rubber mixture, the method comprising:

a) providing the substance of formula A)

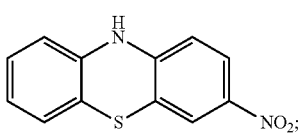

A)

b) providing methyl isobutyl ketone (MIBK) and hydrogen (H$_2$);

c) reacting the substance according to step a) with the substances according to step b) to afford the substance of formula I)

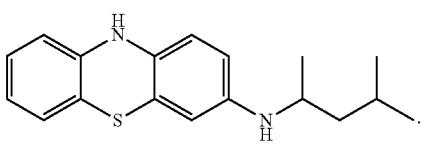

I)

7. A method for producing a rubber mixture, the method comprising:

a1) providing the substance of formula A)

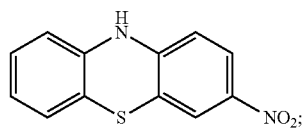

A)

b1) providing a reducing agent, in particular tin (II) chloride dihydrate;

c1) reacting the substance according to step a1) with the substance from step b1) to afford the substance of formula C1)

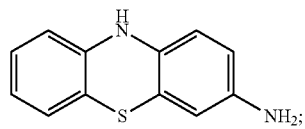

C1)

d1) providing methyl isobutyl ketone (MIBK) and hydrogen (H$_2$);

e1) reacting the substance of formula C1) with the substances according to step d1) to afford the substance of formula I)

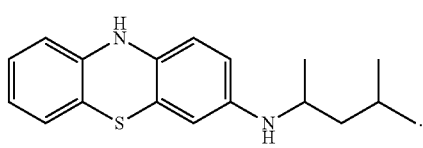

II)

8. The rubber mixture of claim 3, wherein the rubber mixture is incorporated in a tread, a sidewall and/or a flange profile of a vehicle tire.

* * * * *